United States Patent

Hagiwara

(10) Patent No.: US 12,294,074 B2
(45) Date of Patent: May 6, 2025

(54) ANODE SLURRY

(71) Applicant: TOYOTA JIDOSHA KABUSHIKI KAISHA, Toyota (JP)

(72) Inventor: Hideki Hagiwara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 560 days.

(21) Appl. No.: 17/710,057

(22) Filed: Mar. 31, 2022

(65) Prior Publication Data

US 2022/0328801 A1 Oct. 13, 2022

(30) Foreign Application Priority Data

Apr. 13, 2021 (JP) ................................. 2021-067544

(51) Int. Cl.
 *H01M 4/04* (2006.01)
 *H01M 4/38* (2006.01)
(52) U.S. Cl.
 CPC ......... *H01M 4/0416* (2013.01); *H01M 4/386* (2013.01)
(58) Field of Classification Search
 CPC .......................... H01M 4/0416; H01M 4/386
 See application file for complete search history.

(56) References Cited

FOREIGN PATENT DOCUMENTS

| JP | 2015082362 A | 4/2015 |
|---|---|---|
| JP | 2019-125468 A | 7/2019 |
| JP | 2020-004685 A | 1/2020 |

OTHER PUBLICATIONS

Cameo Chemicals material data sheet for mesitylene (1,3,5-trimethylbenzene), published online at https://cameochemicals.noaa.gov/chemical/4714 , 2024 (Year: 2024).*

(Continued)

*Primary Examiner* — Holly Rickman
(74) *Attorney, Agent, or Firm* — Dinsmore & Shohl LLP

(57) ABSTRACT

A main object of the present disclosure is to provide an anode slurry that gives an all solid state battery with suppressed fluctuation of restraining pressure. The present disclosure achieves the object by providing an anode slurry for an all solid state battery, the anode slurry including a Si-based anode active material, a first dispersion medium and a second dispersion medium; and the anode slurry satisfying: (i) when a hydrogen bond term σH of Hansen solubility parameter of, the Si-based anode active material, the first dispersion medium, and the second dispersion medium, are respectively regarded as $\sigma H_{Si}$, $\sigma H_1$ and $\sigma H_2$, and when $\Delta\sigma H_1=\sigma H_{Si}-\sigma H_2$, and $\Delta\sigma H_2=\sigma H_{Si}-\sigma H_2$, the ratio $\Delta\sigma H_2/\Delta\sigma H_1$, which is a ratio of $\Delta\sigma H_2$ with respect to $\Delta\sigma H_1$ is 0.96 or less; (ii) when $T_1$ designates a boiling point of the first dispersion medium, and $T_2$ designates a boiling point of the second dispersion medium, $T_2-T_1 \le 3°$ C.; and (iii) when $W_1$ designates a content of the first dispersion medium and $W_2$ designates a content of the second dispersion medium, $0.1 \le W_2/(W_1+W_2) \le 0.25$.

9 Claims, 3 Drawing Sheets

(56) References Cited

OTHER PUBLICATIONS

Cameo Chemicals material data sheet for butyl butyrate, published online at https://cameochemicals.noaa.gov/report?key=CH10702, 2024 (Year: 2024).*
Charles Hansen, <u>Hansen Solubility Parameters, A User's Handbook</u>, CRC Publishers, 2000, pp. 1-4 (Year: 2000).*
2000.*

* cited by examiner

FIG. 1A
After pasting
FIG. 1B
While drying
(Terminal stage of
constant drying)
FIG. 1C
After drying
FIG. 1D
After pressing
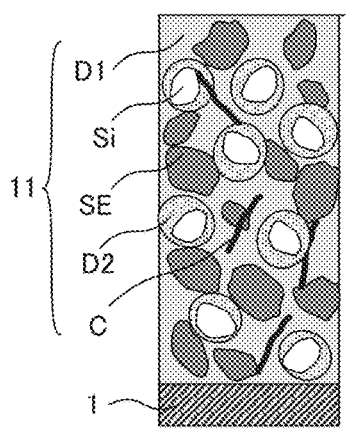 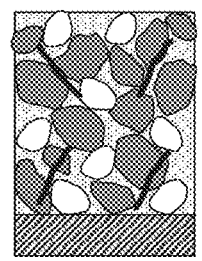 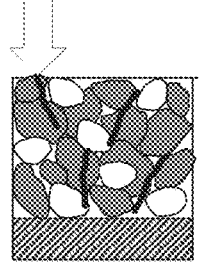 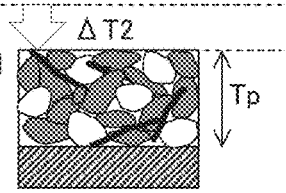
FIG. 2A
After pasting
FIG. 2B
While drying
(Terminal stage of
constant drying)
FIG. 2C
After drying
FIG. 2D
After pressing
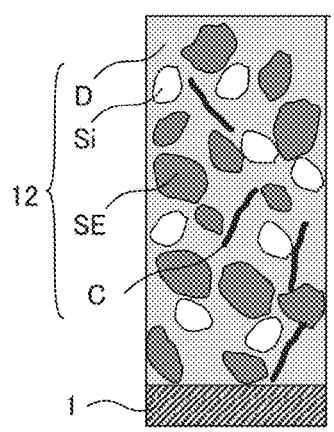 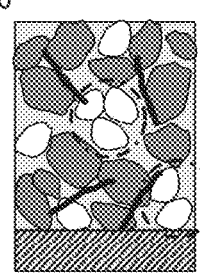 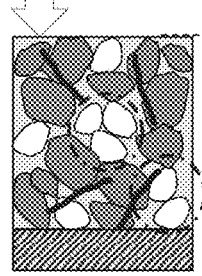 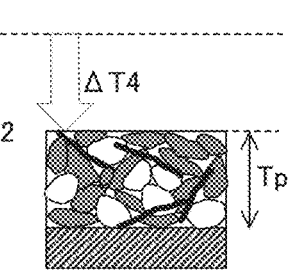

ANODE SLURRY

CROSS REFERENCE TO RELATED APPLICATION

This application claims priority to Japanese Patent Application No. 2021-067544, filed on Apr. 13, 2021, the entire contents of which are incorporated by reference herein.

TECHNICAL FIELD

The present disclosure relates to an anode slurry for an all solid state battery.

BACKGROUND

An all solid state battery is a battery including a solid electrolyte layer between a cathode layer and an anode layer, and one of the advantages thereof is that the simplification of a safety device may be more easily achieved compared to a liquid-based battery including a liquid electrolyte containing a flammable organic solvent.

As an active material used for an anode layer in an all solid state battery, an active material containing Si (Si-based active material) has been known (Patent Literature 1). Also, Patent Literature 2 discloses an electrode slurry for an all solid state battery, the slurry comprising two kinds or more of a solvent, wherein the absolute value εm−εn that is the difference between the relative permittivity εm of a main solvent Sm, which is a solvent occupying the largest volume fraction of the two kinds or more of a solvent, and the relative permittivity εn of a sub solvent Sn, which is a solvent other than the main solvent Sm, is 1.31 or more; and n is a natural number having a maximum value of the number of kinds of the sub solvent.

CITATION LIST

Patent Literatures

Patent Literature 1: Japanese Patent Application Laid-Open (JP-A) No. 2020-004685
Patent Literature 2: JP-A No. 2015-082362

SUMMARY

Technical Problem

One of the advantages of the Si-based active material is that theoretical capacity per volume unit is large, but meanwhile, volume change due to charge and discharge is large. There is a risk of increasing change in restraining pressure of an all solid state battery in the case of using such a Si-based active material having large volume change as an anode active material. When the change in restraining pressure is large, short circuit due to peel-off or slippage of the anode active material layer may occur.

The present disclosure has been made in view of the above circumstances, and a main object thereof is to provide an anode slurry that gives an all solid state battery with suppressed fluctuation of restraining pressure.

Solution to Problem

In order to achieve the object, the present disclosure provides an anode slurry for an all solid state battery, the anode slurry including a Si-based anode active material, a first dispersion medium and a second dispersion medium; and the anode slurry satisfying: (i) when a hydrogen bond term σH of Hansen solubility parameter of, the Si-based anode active material, the first dispersion medium, and the second dispersion medium, are respectively regarded as $\sigma H_{Si}$, $\sigma H_1$ and $\sigma H_2$, and when $\Delta \sigma H_1 = \sigma H_{Si} - \sigma H_1$, and $\Delta \sigma H_2 = \sigma H_{Si} - \sigma H_2$, the ratio $\Delta \sigma H_2 / \Delta \sigma H_1$, which is a ratio of $\Delta \sigma H_2$ with respect to $\Delta \sigma H_1$ is 0.96 or less; (ii) when $T_1$ designates a boiling point of the first dispersion medium, and $T_2$ designates a boiling point of the second dispersion medium, $T_2 - T_1 \geq -3°$ C.; and (iii) when $W_1$ designates a content of the first dispersion medium and $W_2$ designates a content of the second dispersion medium, $0.1 \geq W_2/(W_1+W_2) \leq 0.25$.

According to the present disclosure, the anode slurry satisfies (i), (ii) and (iii), and thus the anode slurry that gives an all solid state battery with suppressed fluctuation of restraining pressure can be provided.

Advantageous Effects of Disclosure

The present disclosure exhibits an effect of providing an anode slurry that gives an all solid state battery with suppressed fluctuation of restraining pressure.

BRIEF DESCRIPTION OF DRAWINGS

FIGS. 1A to 1D are schematic views illustrating the state of each component inside a layer while forming an anode active material layer using the anode slurry in the present disclosure.

FIGS. 2A to 2D are schematic views illustrating the state of each component inside a layer while forming an anode active material layer using conventional anode slurry.

DETAILED DESCRIPTION

Figure 3:
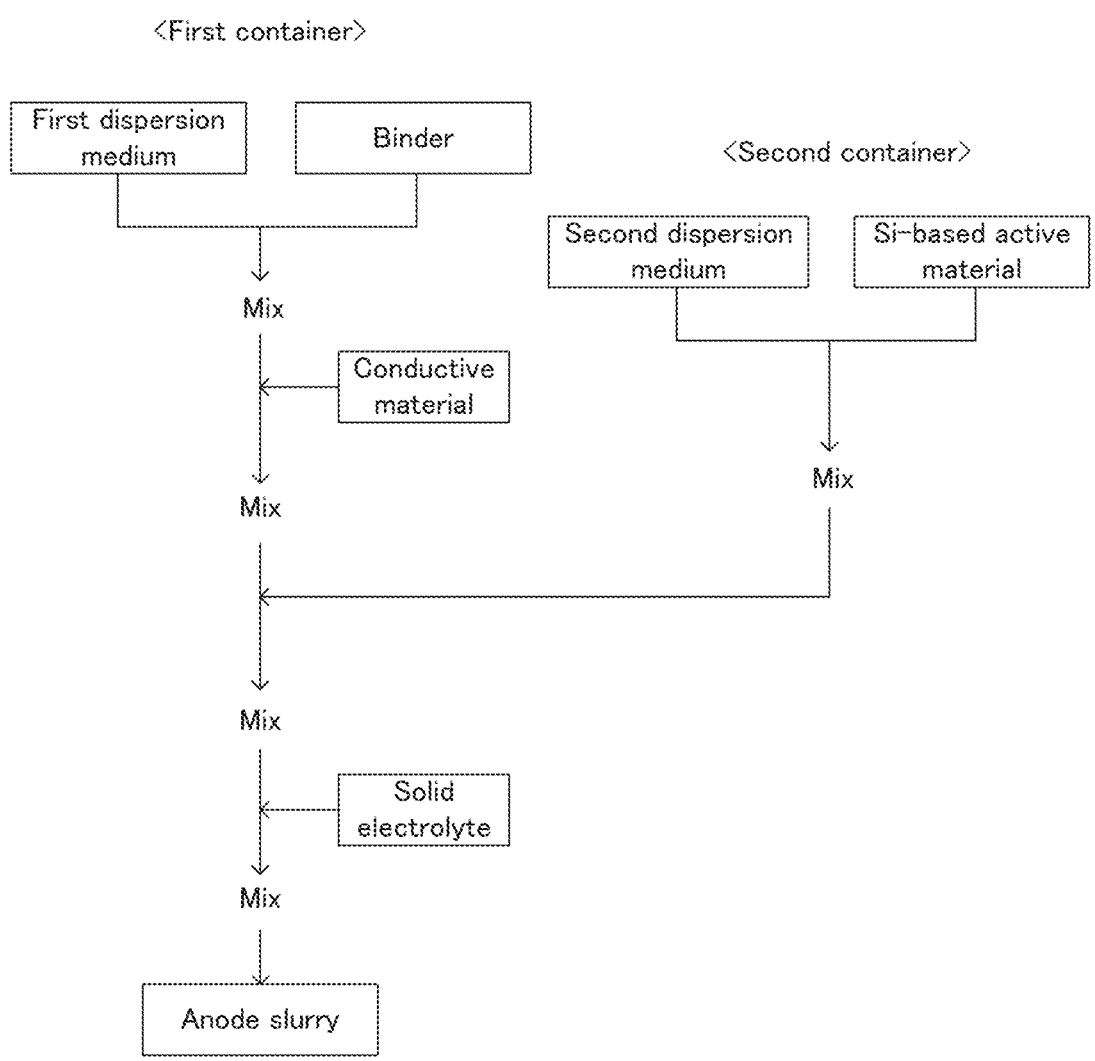
FIG. 3 is a flow chart illustrating an example of the method for producing the anode slurry in the present disclosure.

The anode slurry in the present disclosure will be hereinafter described in details.

The anode slurry in the present disclosure includes a Si-based anode active material, a first dispersion medium and a second dispersion medium; and the anode slurry satisfies: (i) when a hydrogen bond term σH of Hansen solubility parameter of, the Si-based anode active material, the first dispersion medium, and the second dispersion medium, are respectively regarded as $\sigma H_{Si}$, $\sigma H_1$ and $\sigma H_2$, and when $\Delta \sigma H_1 = \sigma H_{Si} - \sigma H_1$, and $\Delta \sigma H_2 = \sigma H_{Si} - \sigma H_2$, the ratio $\Delta \sigma H_2 / \Delta \sigma H_1$, which is a ratio of $\Delta \sigma H_2$ with respect to $\Delta \sigma H_1$ is 0.96 or less; (ii) when T1 designates a boiling point of the first dispersion medium, and $T_2$ designates a boiling point of the second dispersion medium, $T_2 - T_1 \geq -3°$ C.; and (iii) when $W_1$ designates a content of the first dispersion medium and $W_2$ designates a content of the second dispersion medium, $0.1 \geq W_2/(W_1+W_2) \leq 0.25$.

According to the present disclosure, the anode slurry satisfying the (i), (ii) and (iii) allows the anode slurry to give an all solid state battery with suppressed fluctuation of restraining pressure.

FIGS. 2A to 2D are schematic views illustrating the state of each component inside a layer while forming an anode active material layer using conventional anode slurry. In FIGS. 2A to 2D, Si signifies a Si-based anode active material, SE signifies a solid electrolyte layer, C signifies a conductive material, and D signifies a dispersion medium. In conventional anode slurry 12, after pasted on anode current collector 1 (FIG. 2A), the Si-based anode active material aggregates over time while drying (FIG. 2B). For this reason, density of the layer decreases after drying (FIG. 2C). Presumable reason of the increase in the restraining pressure of an all solid state battery is the decrease of layer density and reaction unevenness after drying, which is caused by the aggregation of the Si-based active material in the slurry.

In contrary, the inventor of the present disclosure has found out that the anode slurry satisfying the (i), (ii) and (iii) can suppress the aggregation of the Si-based active material, and can increase the layer density after drying. FIGS. 1A to 1D are schematic views illustrating the state of each component inside a layer while forming an anode active material layer using the anode slurry in the present disclosure. Anode slurry 11 in the present disclosure includes the first dispersion medium D1 as well as the second dispersion medium D2 that is highly compatible with the Si-based active material in the specified ratio, and thus the second dispersion medium D2 is present near the surface of the Si-based active material (FIG. 1A). For this reason, the dispersibility of the Si-based active material presumably improves. Further, the boiling point of the second dispersion medium D2 is approximately equivalent to or higher than that of the first dispersion medium D1, and thus the slipperiness on the surface of the Si-based active material particle can be improved during the deposition in the terminal stage of drying the anode (FIG. 1B). For this reason, the layer density after drying presumably increases (FIG. 1C).

Thus, by using the anode slurry in the present disclosure, a layer thickness deformation amount due to drying ($\Delta T1=T0-T1$) can be larger than conventional layer thickness deformation amount due to drying ($\Delta T3=T0-T2$ in FIGS. 2A to 2D). Thereby, the layer thickness deformation amount due to pressing ($\Delta T2=T1-Tp$) can be reduced from conventional layer thickness deformation amount due to pressing ($\Delta T4=T2-Tp$ in FIGS. 2A to 2D). For this reason, plastic deformation of the solid electrolyte can be reduced, and also, a percolation structure can be secured by restraining the collapse of particles. Thereby, the expansion and contraction of the Si particles inside the electrode due to charge and discharge can be uniformed. The present disclosure focuses on a hydrogen bond term $\sigma H$ of Hansen solubility parameter as an index of the compatibility.

1. First Dispersion Medium and Second Dispersion Medium

The anode slurry in the present disclosure includes a first dispersion medium and a second dispersion medium in the specified range. When a hydrogen bond term $\sigma H$ of Hansen solubility parameter (HSP) of, the Si-based anode active material, the first dispersion medium, and the second dispersion medium, are respectively regarded as $\sigma H_{Si}$, $\sigma H_1$ and $\sigma H_2$, and when $\Delta \sigma H_1=\sigma H_{Si}-\sigma H_1$, and $\Delta \sigma H_2=\sigma H_{Si}-\sigma H_2$, the ratio $\Delta \sigma H_2/\Delta \sigma H_1$, which is a ratio of $\Delta \sigma H_2$ with respect to $\Delta \sigma H_1$ is 0.96 or less. It means that, in the present disclosure, the second dispersion medium is a dispersion medium having higher compatibility with the Si-based active material than that of the first dispersion medium.

HSP has been known as a parameter to evaluate the compatibility of materials. HSP is configured by three parameters (unit: $MPa^{0.5}$): 1. $\sigma D$: Energy from dispersion force between molecules, 2. $\sigma P$: Energy from dipole interaction between molecules, and 3. $\sigma H$: Energy from hydrogen bond between molecules. In the anode slurry material, change amount of $\sigma D$ among materials is little, and $\sigma P$ has limitation. Thus, the present disclosure focuses on $\sigma H$. The hydrogen bond term $\sigma H$ of Hansen solubility parameter may be obtained from, for example, Hansen Solubility Parameters: A user's handbook, Second Edition. Boca Raton, Fla: CRC Press. (Hansen, Charles (2007)).

$\Delta \sigma H_2/\Delta \sigma H_1$ may be 0.91 or less, and may be 0.85 or less. Meanwhile, $\Delta \sigma H_2/\Delta \sigma H_1$ may be 0.13 or more, and may be 0.17 or more.

The first dispersion medium and the second dispersion medium in the present disclosure satisfies $T_2-T_1 \geq -3°$ C. when $T_1$ designates a boiling point of the first dispersion medium, and $T_2$ designates a boiling point of the second dispersion medium. In other words, in the present disclosure, the boiling point of the second dispersion medium is equal to or higher than the boiling point of the first dispersion medium. $T_2-T_1$ may be 0° C. or more and may be 3° C. or more.

Further, in the present disclosure, when $W_1$ designates a content of the first dispersion medium and $W_2$ designates a content of the second dispersion medium, $0.1 \leq W_2/(W_1+W_2) \leq 0.25$ is satisfied. $W_2/(W_1+W_2)$ may be 0.15 or more. Also, $W_2/(W_1+W_2)$ may be 0.2 or less.

Also, when $W_{Si}$ designates the content of the Si-based anode active material in the slurry, the ratio of $W_1$ with respect to $W_{Si}$, which is $W_1/W_{Si}$ is, for example, 1.5 or more and may be 1.6 or more. Meanwhile, $W_1/W_{Si}$ is, for example, 1.8 or less and may be 1.7 or less. Also, the ratio of $W_2$ with respect to $W_{Si}$, which is $W_2/W_{Si}$ is, for example, 0.2 or more and may be 0.3 or more. Meanwhile, $W_2/W_{Si}$ is, for example, 0.5 or less and may be 0.4 or less.

Also, the ratio of the content of the dispersion medium $W_1+W_2$ in the slurry with respect to $W_{Si}$, which is $(W_1+W_2)/W_{Si}$ is not particularly limited, but for example, it is 1 or more and 3 or less, and may be 2.

Examples of the combination of the first dispersion medium and the second dispersion medium satisfying the (i), (ii) and (iii) includes, but not limited to, when the first dispersion medium is mesitylene, the second dispersion medium may be tetralin, diisobutyl keton (DIBK), butyl butyrate, methyl benzoate, dimethyl acetoamide, and benzyl alcohol. When the first dispersion medium is DIBK, examples of the second dispersion medium includes, but not limited to, butyl butyrate, methyl benzoate, dimethyl acetoamide, and benzyl alcohol. When the first dispersion medium is butyl butyrate, examples of the second dispersion medium includes, but not limited to, dimethyl acetoamide and benzyl alcohol.

2. Si-Based Anode Active Material

The anode slurry in the present disclosure contains a Si-based active material as an anode active material. The Si-based active material is, in embodiments, an active material capable of being alloyed with Li. Examples of the Si-based active material may include a simple substance of Si, a Si alloy and a Si oxide. The Si alloy, in embodiments, contains Si element as a main component. The proportion of the Si element in the Si alloy is, for example, 50 mol % or more, may be 70 mol % or more, and may be 90 mol % or more.

The average particle size ($D_{50}$) of the Si-based active material is, for example, 10 nm or more, and may be 100 nm or more. Meanwhile, the average particle size ($D_{50}$) of the Si-based active material is, for example, 50 μm or less, and may be 20 μm or less. The average particle size ($D_{50}$) may be calculated from, for example, a measurement with a laser diffraction particle distribution meter or a scanning electron microscope (SEM).

3. Anode Slurry

The anode slurry in the present disclosure may contain an additional material such as a binder, a solid electrolyte and a conductive material, as required.

Examples of the binder may include a fluoride-based binder such as polyvinylidene fluoride (PVdF), and a rubber-based binder such as butylene rubber (BR) and styrene butadiene rubber (SBR). The proportion of the binder in the solid component of slurry is, for example, 1 weight % or more and 10 weight % or less.

Examples of the solid electrolyte may include an inorganic solid electrolyte such as a sulfide solid electrolyte, an oxide solid electrolyte, a nitride solid electrolyte, and a halide solid electrolyte. In embodiments, the inorganic solid electrolyte may be a sulfide solid electrolyte. Examples of the sulfide solid electrolyte may include a solid electrolyte containing a Li element, an X element (X is at least one kind of P, Si, Ge, Sn, B, Al, Ga, and In), and a S element. Also, the sulfide solid electrolyte may further contain at least one of an O element and a halogen element. The proportion of the solid electrolyte in the solid component of slurry is, for example, 1 weight % or more and 50 weight % or less.

Examples of the conductive material may include a carbon nanotube such as VGCF (vapor-grown carbon fiber) and a carbon material such as carbon nanofiber. The proportion of the conductive material in the solid component of slurry is, for example, 1 weight % or more and 20 weight % or less.

There are no particular limitations on the method for producing the anode slurry in the present disclosure, and for example, the anode slurry may be produced in the manner shown in FIG. 3. First, the first dispersion medium and a binder are put into a first container, mixed, and then a conductive material is added thereto and mixed. The second dispersion medium and the Si-based active material are put into a second container that is a different container from the first container, and then mixed. The mixture of the second dispersion medium and the Si-based active material in the second container is put into the first container and then mixed. Further, a solid electrolyte is put into the first container, and then mixed to obtain the anode slurry. In this manner, by mixing the second dispersion medium and the Si-based active material in advance, the compatibility of the second dispersion medium with the Si-based active material improves.

Figure 4:
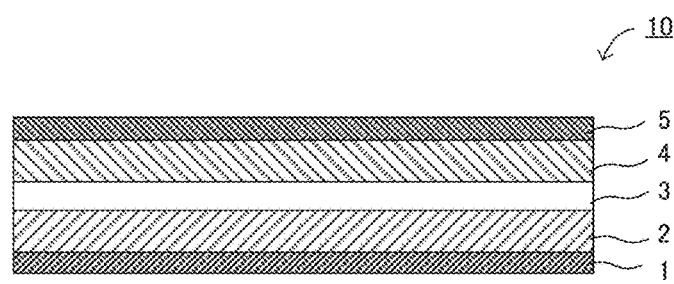
FIG. 4 is a schematic cross-sectional view illustrating an example of the all solid state battery using the anode slurry in the present disclosure.

The anode slurry in the present disclosure is an anode slurry for forming an anode active material layer in an all solid state battery. FIG. 4 is a schematic cross-sectional view illustrating an example of the all solid state battery using the anode slurry in the present disclosure. All solid state battery 10 illustrated in in FIG. 4 includes constituents in the order of anode current collector 1, anode active material layer 2, solid electrolyte layer 3, cathode active material layer 4 and cathode current collector 5. The anode active material layer 2 illustrated in FIG. 4 contains a Si-based active material that is an anode active material. Examples of the method for forming the anode active material layer may include a method in which the above described slurry is pasted on an anode current collector and dried to form the layer. There are no particular limitations on the method for pasting the anode slurry, and known arbitrary pasting methods can be used.

The all solid state battery may be a single battery and may be a layered battery. The layered battery may be a monopolar layered battery (layered battery connected in parallel), and may be a bipolar layered battery (layered battery connected in series). Examples of the shape of the battery may include a coin shape, a laminate shape, a cylindrical shape and a square shape.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Comparative Example 1-1

[Production of Anode Slurry]

A dispersion medium (mesitylene) and a binder (SBR) were put into a container, mixed, and then a conductive material (VGCF) was put thereinto, then mixed. Further, a Si-based active material (a simple substance of Si) was put into the container, and then mixed. Furthermore, a sulfide solid electrolyte was put into the container, and then mixed. Thereby, an anode slurry having the composition shown in Table 1 was obtained.

[Production of Evaluation Cell]

The obtained anode slurry was pasted on an anode current collector (a Ni foil, 24 μm thick), and dried at 210° C. to form an anode active material layer.

A cathode active material ($LiNi_{1/3}Co_{1/3}Mn_{1/3}O_2$), a dispersion medium (butyl butyrate), a binder (5 wt % butyl butyrate solution; PVdF-based binder), a sulfide solid electrolyte ($Li_2S$—$P_2S_5$-based glass ceramic containing LiBr and LiI), and a conductive material (VGCF) were mixed to produce a cathode composition in paste form. This composition was pasted on an aluminum foil (cathode current collector) having a thickness of 10 μm and dried to form a cathode active material layer.

A dispersion medium (heptane), a binder (5 wt % heptane solution; butadiene rubber), and a sulfide solid electrolyte ($Li_2S$—$P_2S_5$-based glass ceramic containing LiBr and LiI) were mixed to produce a solid electrolyte composition. This composition was pasted on an aluminum foil (substrate) and dried to form a solid electrolyte layer.

Figure 5A:
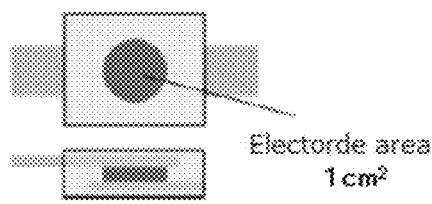
FIGS. 5A and 5B are views describing the method for measuring the change in restraining pressure in Examples and Comparative Examples.

The solid electrolyte layer and the cathode active material layer were layered so that the solid electrolyte layer contacted with the cathode active material layer, and then pressed. Then, the substrate (aluminum foil) of the solid electrolyte layer was peeled off, and the anode active material layer was layered thereto so that the solid electrolyte layer contacted with the anode active material layer, and then pressed. In this manner, an evaluation cell as shown in FIG. 5A was produced. Incidentally, the electrode area was 1 $cm^2$. The thickness of the cathode active material layer (density: 3.7 g/cc) was 70.0 μm, the thickness of the solid electrolyte layer was 15.0 μm, and the thickness of the anode active material layer (density: 1.8 g/cc) was 45.3 μm.

[Evaluation of Change in Restraining Pressure]

Figure 5B:
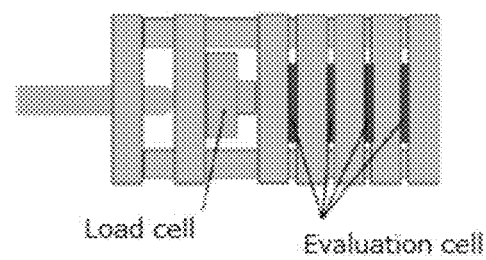

Four of the evaluation cell were set in a jig as shown in FIG. 5B, change in the restraining pressure was measured with a load cell, and the effect of suppressing the fluctuation of restraining pressure was evaluated. In specific, the change in restraining pressure was standardized from the following formula, and evaluated.

(Restraining pressure (MPa) after charge was terminated−Restraining pressure (MPa) at the time of starting charge)/(Number of cells*Capacity (mAh) at the time of terminating charge)

The case where the value obtained from the formula was 0.29 MPa/mAh or less was evaluated as ○, and the case where the value was more than 0.29 MPa/mAh was evaluated as ×. The results are shown in Table 1. Also, the anode slurry was pasted on the anode current collector and dried, then the electrode density was calculated. The results are shown in Table 1.

Examples 1-1 to 1-6 and Comparative Examples 1-2 to 1-3

An anode slurry was respectively produced in the same manner as in Comparative Example 1-1 except that a first dispersion medium (mesitylene) and a second dispersion medium shown in Table 1 was respectively used as the dispersion medium, and blended in the weight ratio shown in Table 1, an evaluation cell was respectively produced using the anode slurry, and then evaluated. Also, in comparison with the case where the dispersion medium was solely the first dispersion medium, the case where the time taken until drying completed was later in 20% or more was evaluated as Δ, and the case where the time was later in less than 20% was evaluated as ○. The results are shown in Table 1.

Comparative Example 2-1

An anode slurry was produced in the same manner as in Comparative Example 1-1 except that diisobutyl ketone (DIBK) was used as the dispersion medium, and blended in the weight ratio shown in Table 2, an evaluation cell was produced using the anode slurry, and then evaluated. The results are shown in Table 2.

Examples 2-1 to 2-4 and Comparative Examples 2-2 to 2-5

An anode slurry was respectively produced in the same manner as in Comparative Example 1-1, except that a first dispersion medium (DIBK) and the second dispersion medium shown in Table 2 were respectively used as the dispersion mediums, and blended in the weight ratio shown in Table 2, an evaluation cell was produced respectively using the anode slurry, and then evaluated. The results are shown in Table 2.

TABLE 1

| | Anode slurry | | Comp. Ex. 1-1 | Comp. Ex. 1-2 | Comp. Ex. 1-3 | Ex. 1-1 | Ex. 1-2 | Ex. 1-3 | Ex. 1-4 | Ex. 1-5 | Ex. 1-6 |
|---|---|---|---|---|---|---|---|---|---|---|---|
| Composition | Anode active material | Material | Si | Si | Si | Si | Si | Si | Si | Si | Si |
| | | $\sigma H_{Si}$ [MPa$^{0.5}$] | 15.7 | 15.7 | 15.7 | 15.7 | 15.7 | 15.7 | 15.7 | 15.7 | 15.7 |
| | | Weight ratio | 1.0 | 1.0 | 1.0 | 1.0 | 1.0 | 1.0 | 1.0 | 1.0 | 1.0 |
| | Solid electrolyte | Material | Sulfide-based | Sulfide-based | Sulfide-based | Sulfide-based | Sulfide-based | Sulfide-based | Sulfide-based | Sulfide-based | Sulfide-based |
| | Conductive material | Material | VGCF | VGCF | VGCF | VGCF | VGCF | VGCF | VGCF | VGCF | VGCF |
| | Binder | Material | SBR | SBR | SBR | SBR | SBR | SBR | SBR | SBR | SBR |
| | First dispersion medium | Material | Mesitylene | Mesitylene | Mesitylene | Mesitylene | Mesitylene | Mesitylene | Mesitylene | Mesitylene | Mesitylene |
| | | $\sigma H_1$ [MPa$^{0.5}$] | 0.6 | 0.6 | 0.6 | 0.6 | 0.6 | 0.6 | 0.6 | 0.6 | 0.6 |
| | | Boiling point $T_1$ [° C.] | 165 | 165 | 165 | 165 | 165 | 165 | 165 | 165 | 165 |
| | | Weight ratio $W_1/W_{Si}$ | 2.0 | 1.8 | 1.8 | 1.8 | 1.8 | 1.8 | 1.8 | 1.8 | 1.8 |
| | Second dispersion medium | Material | — | Chlorobenzene | Xylene | Tetralin | DIBK | Butyl butyrate | Methyl benzoate | Dimethyl acetamide | Benzyl alcohol |
| | | $\sigma H_2$ [MPa$^{0.5}$] | — | 2.0 | 3.1 | 2.9 | 4.2 | 5.6 | 4.7 | 7.5 | 13.7 |
| | | Boiling point $T_2$ [° C.] | — | 131 | 144 | 207.2 | 168 | 166 | 198 | 165 | 205 |
| | | Weight ratio $W_2/W_{Si}$ | — | 0.2 | 0.2 | 0.2 | 0.2 | 0.2 | 0.2 | 0.2 | 0.2 |
| Properties | | $\Delta \sigma H_1 = \sigma H_{Si} - \sigma H_1$ [MPa$^{0.5}$] | 15.1 | 15.1 | 15.1 | 15.1 | 15.1 | 15.1 | 15.1 | 15.1 | 15.1 |
| | | $\Delta \sigma H_2 = \sigma H_{Si} - \sigma H_2$ [MPa$^{0.5}$] | — | 13.7 | 12.6 | 12.8 | 11.5 | 10.1 | 11.0 | 8.2 | 2.0 |
| | | $\Delta \sigma H_2 / \Delta \sigma H_1$ | — | 0.91 | 0.83 | 0.85 | 0.76 | 0.67 | 0.73 | 0.54 | 0.13 |
| | | $T_2 - T_1$ [° C.] | — | −34 | −21 | 42.2 | 3 | 1 | 33 | 0 | 40 |
| | | $W_2/(W_1 + W_2)$ | — | 0.1 | 0.1 | 0.1 | 0.1 | 0.1 | 0.1 | 0.1 | 0.1 |
| Process | | Mixing in advance | — | None | None | None | None | None | None | None | None |
| | | Electrode drying temperature [° C.] | 210 | 210 | 210 | 210 | 210 | 210 | 210 | 210 | 210 |
| Evaluation | | Electrode drying speed | — | ○ | ○ | ○ | ○ | ○ | ○ | ○ | ○ |
| | | Electrode density (after drying) [g/cm$^3$] | 6.5 | 6.5 | 6.1 | 7.4 | 7.2 | 7.5 | 7.7 | 7.8 | 7.9 |
| | | Change in restraining pressure [MPa/mAh] | 0.33 | 0.32 | 0.34 | 0.25 | 0.26 | 0.24 | 0.23 | 0.24 | 0.23 |
| | | Change in restraining pressure: Judgement | X | X | X | ○ | ○ | ○ | ○ | ○ | ○ |

TABLE 2

| | Anode slurry | | Comp. Ex. 2-1 | Comp. Ex. 2-2 | Comp. Ex. 2-3 | Comp. Ex. 2-4 | Comp. Ex. 2-5 | Ex. 2-1 | Ex. 2-2 | Ex. 2-3 | Ex. 2-4 |
|---|---|---|---|---|---|---|---|---|---|---|---|
| Composition | Anode active material | Material | Si | Si | Si | Si | Si | Si | Si | Si | Si |
| | | $\sigma H_{Si}$ [MPa$^{0.5}$] | 15.7 | 15.7 | 15.7 | 15.7 | 15.7 | 15.7 | 15.7 | 15.7 | 15.7 |
| | | Weight ratio | 1.0 | 1.0 | 1.0 | 1.0 | 1.0 | 1.0 | 1.0 | 1.0 | 1.0 |
| | Solid electrolyte | Material | Sulfide-based | Sulfide-based | Sulfide-based | Sulfide-based | Sulfide-based | Sulfide-based | Sulfide-based | Sulfide-based | Sulfide-based |
| | Conductive material | Material | VGCF | VGCF | VGCF | VGCF | VGCF | VGCF | VGCF | VGCF | VGCF |
| | Binder | Material | SBR | SBR | SBR | SBR | SBR | SBR | SBR | SBR | SBR |
| | First dispersion medium | Material | DIBK | DIBK | DIBK | DIBK | DIBK | DIBK | DIBK | DIBK | DIBK |
| | | $\sigma H_1$ [MPa$^{0.5}$] | 4.2 | 4.2 | 4.2 | 4.2 | 4.2 | 4.2 | 4.2 | 4.2 | 4.2 |
| | | Boiling point $T_1$ [° C.] | 168 | 168 | 168 | 168 | 168 | 168 | 168 | 168 | 168 |
| | | Weight ratio $W_1/Wsi$ | 1.8 | 1.8 | 1.8 | 1.8 | 1.8 | 1.8 | 1.8 | 1.8 | 1.8 |
| | Second dispersion medium | Material | — | Mesitylene | Chlorobenzene | Tetralin | Xylene | Butyl butyrate | Methyl benzoate | Dimethyl acetoamide | Benzyl alcohol |
| | | $\sigma H_2$ [MPa$^{0.5}$] | — | 0.6 | 2.0 | 2.9 | 3.1 | 5.6 | 4.7 | 7.5 | 13.7 |
| | | Boiilng point $T_2$ [° C.] | — | 165 | 131 | 207.2 | 144 | 166 | 198 | 165 | 205 |
| | | Weight ratio $W_2/Wsi$ | — | 0.2 | 0.2 | 0.2 | 0.2 | 0.2 | 0.2 | 0.2 | 0.2 |
| Properties | | $\Delta \sigma H_1 = \sigma H_{Si} - \sigma H_1$ [MPa$^{0.5}$] | 11.5 | 11.5 | 11.5 | 11.5 | 11.5 | 11.5 | 11.5 | 11.5 | 11.5 |
| | | $\Delta \sigma H_2 = \sigma H_{Si} - \sigma H_2$ [MPa$^{0.5}$] | — | 15.1 | 13.7 | 12.8 | 12.6 | 10.1 | 11.0 | 8.2 | 2.0 |
| | | $\Delta \sigma H_2/\Delta \sigma H_1$ | — | 1.31 | 1.19 | 1.11 | 1.10 | 0.88 | 0.96 | 0.71 | 0.17 |
| | | $T_2 - T_1$ [° C.] | — | -3 | -37 | 39.2 | -24 | -2 | 30 | -3 | 37 |
| | | $W_2/(W_1 + W_2)$ | — | 0.1 | 0.1 | 0.1 | 0.1 | 0.1 | 0.1 | 0.1 | 0.1 |
| Process | | Mixing in advance | — | None | None | None | None | None | None | None | None |
| | | Electrode drying temperature [° C.] | 210 | 210 | 210 | 210 | 210 | 210 | 210 | 210 | 210 |
| Evaluation | | Electrode drying speed | — | ○ | ○ | ○ | ○ | ○ | ○ | ○ | ○ |
| | | Electrode density (after drying) [g/cm$^3$] | 6.4 | 6.4 | 6.2 | 6.7 | 6.5 | 7.2 | 7.7 | 7.8 | 7.8 |
| | | Change in restraining pressure [MPa/mAh] | 0.35 | 0.35 | 0.33 | 0.35 | 0.33 | 0.27 | 0.25 | 0.25 | 0.23 |
| | | Change in restraining pressure: Judgement | X | X | X | X | X | ○ | ○ | ○ | ○ |

Comparative Example 3-1

An anode slurry was produced in the same manner as in Comparative Example 1-1 except that butyl butyrate was used as the dispersion medium and blended in the weight ratio shown in Table 3, an evaluation cell was produced using the anode slurry, and evaluated. The results are shown in Table 3.

Examples 3-1 to 3-2 and Comparative Examples 3-2 to 3-7

An anode slurry was respectively produced in the same manner as in Comparative Example 1-1 except that a first dispersion medium (butyl butyrate) and a second dispersion medium shown in Table 3 were respectively used and blended in the weight ratio shown in Table 3, an evaluation cell was respectively produced using the anode slurry, and evaluated. The results are shown in Table 3.

TABLE 3

| | Anode slurry | | Comp. Ex. 3-1 | Comp. Ex. 3-2 | Comp. Ex. 3-3 | Comp. Ex. 3-4 | Comp. Ex. 3-5 | Comp. Ex. 3-6 | Comp. Ex. 3-7 | Ex. 3-1 | Ex. 3-2 |
|---|---|---|---|---|---|---|---|---|---|---|---|
| Composition | Anode active material | Material | Si | Si | Si | Si | Si | Si | Si | Si | Si |
| | | $\sigma H_{Si}$ [MPa$^{0.5}$] | 15.7 | 15.7 | 15.7 | 15.7 | 15.7 | 15.7 | 15.7 | 15.7 | 15.7 |
| | | Weight ratio | 1.0 | 1.0 | 1.0 | 1.0 | 1.0 | 1.0 | 1.0 | 1.0 | 1.0 |
| | Solid electrolyte | Material | Sulfide-based | Sulfide-based | Sulfide-based | Sulfide-based | Sulfide-based | Sulfide-based | Sulfide-based | Sulfide-based | Sulfide-based |
| | Conductive material | Material | VGCF | VGCF | VGCF | VGCF | VGCF | VGCF | VGCF | VGCF | VGCF |
| | Binder | Material | SBR | SBR | SBR | SBR | SBR | SBR | SBR | SBR | SBR |
| | First dispersion medium | Material | Butyl butyrate | Butyl butyrate | Butyl butyrate | Butyl butyrate | Butyl butyrate | Butyl butyrate | Butyl butyrate | Butyl butyrate | Butyl butyrate |
| | | $\sigma H_1$ [MPa$^{0.5}$] | 5.6 | 5.6 | 5.6 | 5.6 | 5.6 | 5.6 | 5.6 | 5.6 | 5.6 |
| | | Boiling point $T_1$ [° C.] | 166 | 166 | 166 | 166 | 166 | 166 | 166 | 166 | 166 |
| | | Weight ratio $W_1/Wsi$ | 1.8 | 1.8 | 1.8 | 1.8 | 1.8 | 1.8 | 1.8 | 1.8 | 1.8 |
| | Second dispersion medium | Material | — | Mesitylene | Chlorobenzene | Tetralin | Xylene | DIBK | Methyl benzoate | Dimethyl acetoamide | Benzyl alcohol |
| | | $\sigma H_2$ [MPa$^{0.5}$] | — | 0.6 | 2.0 | 2.9 | 3.1 | 4.1 | 4.7 | 7.5 | 13.7 |
| | | Boiilng point $T_2$ [° C.] | — | 165 | 131 | 207.2 | 144 | 168 | 198 | 165 | 205 |

TABLE 3-continued

| | Anode slurry | | Comp. Ex. 3-1 | Comp. Ex. 3-2 | Comp. Ex. 3-3 | Comp. Ex. 3-4 | Comp. Ex. 3-5 | Comp. Ex. 3-6 | Comp. Ex. 3-7 | Ex. 3-1 | Ex. 3-2 |
|---|---|---|---|---|---|---|---|---|---|---|---|
| | Weight ratio $W_2/W_{si}$ | | — | 0.2 | 0.2 | 0.2 | 0.2 | 0.2 | 0.2 | 0.2 | 0.2 |
| Properties | $\Delta \sigma H_1 = \sigma H_{Si} - \sigma H_1$ [MPa$^{0.5}$] | | 10.1 | 10.1 | 10.1 | 10.1 | 10.1 | 10.1 | 10.1 | 10.1 | 10.1 |
| | $\Delta \sigma H_2 = \sigma H_{Si} - \sigma H_2$ [MPa$^{0.5}$] | | — | 15.1 | 13.7 | 12.8 | 12.6 | 11.6 | 11.0 | 8.2 | 2.0 |
| | $\Delta \sigma H_2 / \Delta \sigma H_1$ | | — | 1.50 | 1.36 | 1.27 | 1.25 | 1.15 | 1.09 | 0.81 | 0.20 |
| | $T_2 - T_1$ [° C.] | | — | −1 | −35 | 41.2 | −22 | 2 | 32 | −1 | 39 |
| | $W_2/(W_1 + W_2)$ | | — | 0.1 | 0.1 | 0.1 | 0.1 | 0.1 | 0.1 | 0.1 | 0.1 |
| Process | Mixing in advance | | — | None | None | None | None | None | None | None | None |
| | Electrode drying temperature [° C.] | | 210 | 210 | 210 | 210 | 210 | 210 | 210 | 210 | 210 |
| Evaluation | Electrode drying speed | | — | ◯ | ◯ | ◯ | ◯ | ◯ | ◯ | ◯ | ◯ |
| | Electrode density (after drying) [g/cm$^3$] | | 6.6 | 6.2 | 6.2 | 6.5 | 6.1 | 6.6 | 6.6 | 7.4 | 7.6 |
| | Change in restraining pressure [MPa/mAh] | | 0.35 | 0.35 | 0.33 | 0.35 | 0.33 | 0.35 | 0.35 | 0.25 | 0.25 |
| | Change in restraining pressure: Judgement | | X | X | X | X | X | X | X | ◯ | ◯ |

Comparative Example 4-1

An anode slurry was produced in the same manner as in Comparative Example 1-1 except that mesitylene was used as the dispersion medium and blended in the weight ratio shown in Table 4, an evaluation cell was produced using the anode slurry, and evaluated. The results are shown in Table 4.

Examples 4-1 to 4-3 and Comparative Examples 4-2 to 4-3

An anode slurry was respectively produced in the same manner as in Comparative Example 1-1 except that a first dispersion medium (mesitylene) and a second dispersion medium (tetralin) were respectively used as the dispersion medium and blended in the weight ratio shown in Table 4, an evaluation cell was respectively produced using the anode slurry, and evaluated. The results are shown in Table 4. Incidentally, Example 4-1 is the same as Example 1-1.

Example 4-4

A first dispersion medium (mesitylene) and a binder (SBR) were put into a first container and then mixed. After that, a conductive material (VGCF) was put into the container and kneaded. A second dispersion medium (tetralin) and a Si-based active material (a simple substance of Si) were put into a second container that was a different container from the first container, and then mixed. The mixture of the second dispersion medium and the Si-based active material in the second container was put into the first container. Further, a sulfide solid electrolyte was put into the first container and then mixed. Thereby, an anode slurry having the composition shown in Table 4 was obtained. An evaluation cell was produced in the same manner as in Comparative Example 1-1 except that the obtained anode slurry was used, and evaluated. The results are shown in Table 4.

TABLE 4

| | Anode slurry | | | Comp. Ex. 4-1 | Comp. Ex. 4-2 | Comp. Ex. 4-3 | Ex. 4-1 | Ex. 4-2 | Ex. 4-3 | Ex. 4-4 |
|---|---|---|---|---|---|---|---|---|---|---|
| Composition | Anode active material | Material | | Si | Si | Si | Si | Si | Si | Si |
| | | $\sigma H_{Si}$ [MPa$^{0.5}$] | | 15.7 | 15.7 | 15.7 | 15.7 | 15.7 | 15.7 | 15.7 |
| | | Weight ratio | | 1.0 | 1.0 | 1.0 | 1.0 | 1.0 | 1.0 | 1.0 |
| | Solid electrolyte | Material | | Sulfide-based | Sulfide-based | Sulfide-based | Sulfide-based | Sulfide-based | Sulfide-based | Sulfide-based |
| | Conductive material | Material | | VGCF | VGCF | VGCF | VGCF | VGCF | VGCF | VGCF |
| | Binder | Material | | SBR | SBR | SBR | SBR | SBR | SBR | SBR |
| | First dispersion medium | Material | | Mesitylene | Mesitylene | Mesitylene | Mesitylene | Mesitylene | Mesitylene | Mesitylene |
| | | $\sigma H_1$ [MPa$^{0.5}$] | | 0.6 | 0.6 | 0.6 | 0.6 | 0.6 | 0.6 | 0.6 |
| | | Boiling point $T_1$ [° C.] | | 165 | 165 | 165 | 165 | 165 | 165 | 165 |
| | | Weight ratio $W_1/W_{si}$ | | 2.0 | 1.9 | 1 | 1.8 | 1.7 | 1.5 | 1.8 |
| | Second dispersion medium | Material | | — | Tetralin | Tetralin | Tetralin | Tetralin | Tetralin | Tetralin |
| | | $\sigma H_2$ [MPa$^{0.5}$] | | — | 2.9 | 2.9 | 2.9 | 2.9 | 2.9 | 2.9 |
| | | Boiling point $T_2$ [° C.] | | — | 207.2 | 207.2 | 207.2 | 207.2 | 207.2 | 207.2 |
| | | Weight ratio $W_2/W_{si}$ | | — | 0.1 | 1 | 0.2 | 0.3 | 0.5 | 0.2 |
| Properties | $\Delta \sigma H_1 = \sigma H_{Si} - \sigma H_1$ [MPa$^{0.5}$] | | | 15.1 | 15.1 | 15.1 | 15.1 | 15.1 | 15.1 | 15.1 |
| | $\Delta \sigma H_2 = \sigma H_{Si} - \sigma H_2$ [MPa$^{0.5}$] | | | — | 12.8 | 12.8 | 12.8 | 12.8 | 12.8 | 12.8 |
| | $\Delta \sigma H_2 / \Delta \sigma H_1$ | | | — | 0.85 | 0.85 | 0.85 | 0.85 | 0.85 | 0.85 |
| | $T_2 - T_1$ [° C.] | | | — | 42.2 | 42.2 | 42.2 | 42.2 | 42.2 | 42.2 |
| | $W_2/(W_1 + W_2)$ | | | — | 0.05 | 0.5 | 0.1 | 0.15 | 0.25 | 0.1 |
| Process | Mixing in advance | | | — | None | None | None | None | None | Done |
| | Electrode drying temperature [° C.] | | | 210 | 210 | 210 | 210 | 210 | 210 | 210 |

TABLE 4-continued

| Anode slurry | | Comp. Ex. 4-1 | Comp. Ex. 4-2 | Comp. Ex. 4-3 | Ex. 4-1 | Ex. 4-2 | Ex. 4-3 | Ex. 4-4 |
|---|---|---|---|---|---|---|---|---|
| Evaluation | Electrode drying speed | — | ◯ | Δ | ◯ | ◯ | ◯ | ◯ |
| | Electrode density (after drying) [g/cm$^3$] | 6.5 | 6.5 | 6.8 | 7.4 | 7.5 | 7.2 | 7.7 |
| | Change in restraining pressure [MPa/mAh] | 0.33 | 0.35 | 0.34 | 0.25 | 0.23 | 0.26 | 0.22 |
| | Change in restraining pressure: Judgement | X | X | X | ◯ | ◯ | ◯ | ◎ |

From the results of Tables 1 to 4, it was confirmed that the electrode density after drying improved and the all solid state battery with suppressed fluctuation of restraining pressure was obtained when the anode slurry in the present disclosure was used. Also, in Example 4-4 using the anode slurry produced by mixing the second dispersion medium and Si in advance, it was confirmed that the change in restraining pressure was particularly suppressed.

REFERENCE SIGNS LIST 1 anode current collector
2 anode active material layer
3 solid electrolyte layer
4 cathode active material layer
5 cathode current collector
10 all solid state battery

What is claimed is:

1. An anode slurry for an all solid state battery, the anode slurry comprising:
  a Si-based anode active material, a first dispersion medium, and a second dispersion medium; and
  the anode slurry satisfying:
  (i) when a hydrogen bond term σH of Hansen solubility parameter of the Si-based anode active material, the first dispersion medium, and the second dispersion medium are respectively regarded as $\sigma H_{Si}$, $\sigma H_1$ and $\sigma H_2$, and
  when $\Delta \sigma H_1 = \sigma H_{Si} - \sigma H_1$, and $\Delta \sigma H_2 = \sigma H_{Si} - \sigma H_2$, the ratio $\Delta \sigma H_2 / \Delta \sigma H_1$, which is a ratio of $\Delta \sigma H_2$ with respect to $\Delta \sigma H_1$ is 0.96 or less;
  (ii) when $T_1$ designates a boiling point of the first dispersion medium, and $T_2$ designates a boiling point of the second dispersion medium, $T_2 - T_1 \geq -3°$ C.;
  (iii) when $W_1$ designates a weight of the first dispersion medium, and $W_2$ designates a weight of the second dispersion medium, $0.1 \leq W_2/(W_1+W_2) \leq 0.25$; and
  (iv) the first dispersion medium is mesitylene, diisobutyl ketone (DIBK), or butyl butyrate, wherein:
    when the first dispersion medium is mesitylene, the second dispersion medium comprises at least one of tetralin, DIBK, methyl benzoate, dimethyl acetoamide, or benzyl alcohol:
    when the first dispersion medium is DIBK, the second dispersion medium comprises at least one of butyl butyrate, methyl benzoate, dimethyl acetoamide, or benzyl alcohol; and
    when the first dispersion medium is butyl butyrate, the second dispersion medium comprises at least one of dimethyl acetoamide or benzyl alcohol.

2. The anode slurry of claim 1, wherein:
the first dispersion medium is mesitylene; and
the second dispersion medium comprises at least one of tetralin, diisobutyl keton (DIBK), methyl benzoate, dimethyl acetoamide, or benzyl alcohol.

3. The anode slurry of claim 1, wherein:
the first dispersion medium is DIBK; and
the second dispersion medium comprises at least one of butyl butyrate, methyl benzoate, dimethyl acetoamide, or benzyl alcohol.

4. The anode slurry of claim 1, wherein:
the first dispersion medium is butyl butyrate; and
the second dispersion medium comprises at least one of dimethyl acetoamide or benzyl alcohol.

5. The anode slurry of claim 1, wherein:
the first dispersion medium is mesitylene; and
the second dispersion medium is selected from the group consisting of tetralin, diisobutyl keton (DIBK), methyl benzoate, dimethyl acetoamide, or benzyl alcohol.

6. The anode slurry of claim 1, wherein:
the first dispersion medium is DIBK; and
the second dispersion medium is selected from the group consisting of butyl butyrate, methyl benzoate, dimethyl acetoamide, or benzyl alcohol.

7. The anode slurry of claim 1, wherein:
the first dispersion medium is butyl butyrate; and
the second dispersion medium is selected from the group consisting of dimethyl acetoamide or benzyl alcohol.

8. The anode slurry of claim 1, wherein:
when the first dispersion medium is mesitylene, the second dispersion medium is selected from the group consisting of dimethyl acetoamide and benzyl alcohol;
when the first dispersion medium is DIBK, the second dispersion medium is selected from the group consisting of methyl benzoate, dimethyl acetoamide, and benzyl alcohol; and
when the first dispersion medium is butyl butyrate, the second dispersion medium is benzyl alcohol.

9. The anode slurry of claim 1, wherein:
the first dispersion medium is mesitylene; and
the second dispersion medium is tetralin.

* * * * *